US012161179B2

(12) United States Patent
Cho

(10) Patent No.: US 12,161,179 B2
(45) Date of Patent: Dec. 10, 2024

(54) HAT HAVING REAR-VIEW CAMERA

(71) Applicant: Sung Jae Cho, Miryang-si (KR)

(72) Inventor: Sung Jae Cho, Miryang-si (KR)

( * ) Notice: Subject to any disclaimer, the term of this patent is extended or adjusted under 35 U.S.C. 154(b) by 256 days.

(21) Appl. No.: 17/948,803

(22) Filed: Sep. 20, 2022

(65) Prior Publication Data

US 2024/0023660 A1 Jan. 25, 2024

(30) Foreign Application Priority Data

Jul. 21, 2022 (KR) .................... 10-2022-0090196

(51) Int. Cl.
*H04N 23/57* (2023.01)
*A42B 1/242* (2021.01)
*H04N 23/53* (2023.01)

(52) U.S. Cl.
CPC ............ *A42B 1/242* (2013.01); *H04N 23/531* (2023.01); *H04N 23/57* (2023.01)

(58) Field of Classification Search
CPC ...... H04N 23/50; H04N 23/51; H04N 23/531; H04N 23/57; G03B 17/56; G03B 17/561; G03B 17/563; G03B 17/566
USPC .................................................. 348/207.99
See application file for complete search history.

(56) References Cited

U.S. PATENT DOCUMENTS

| 2007/0271687 | A1* | 11/2007 | Zhou | A42B 3/0426 2/410 |
| 2008/0239080 | A1* | 10/2008 | Moscato | A42B 3/0426 348/148 |
| 2013/0128046 | A1* | 5/2013 | Gindin | A42B 3/0426 348/148 |
| 2017/0171515 | A1* | 6/2017 | Pender | A42B 1/242 |
| 2017/0366710 | A1* | 12/2017 | Vaughn | H04N 23/45 |
| 2021/0120213 | A1* | 4/2021 | Beni | G02B 27/0101 |

FOREIGN PATENT DOCUMENTS

CN 203279885 U * 11/2013
CN 110477497 A * 11/2019

* cited by examiner

*Primary Examiner* — Anthony J Daniels
(74) *Attorney, Agent, or Firm* — Sughrue Mion, PLLC

(57) ABSTRACT

The present invention relates to a hat having a rear-view camera that includes a hat body with an insertion body and a brim, an upward/downward extension and contraction part disposed on the peak of the insertion body and thus extending upward or contracting downward vertically to freely adjust the rear-view camera disposed on top thereof upward and downward in height, and a forward/backward extension and contraction part freely adjusted forward and backward in length from the top of the brim to freely adjust a display part forward and backward, so that the rear-view camera is freely adjusted in height on the top of the insertion body of the hat body to allow a video providing a situation behind a wearer who wears the hat body to be transmitted to the display part.

6 Claims, 11 Drawing Sheets

[Fig. 1]
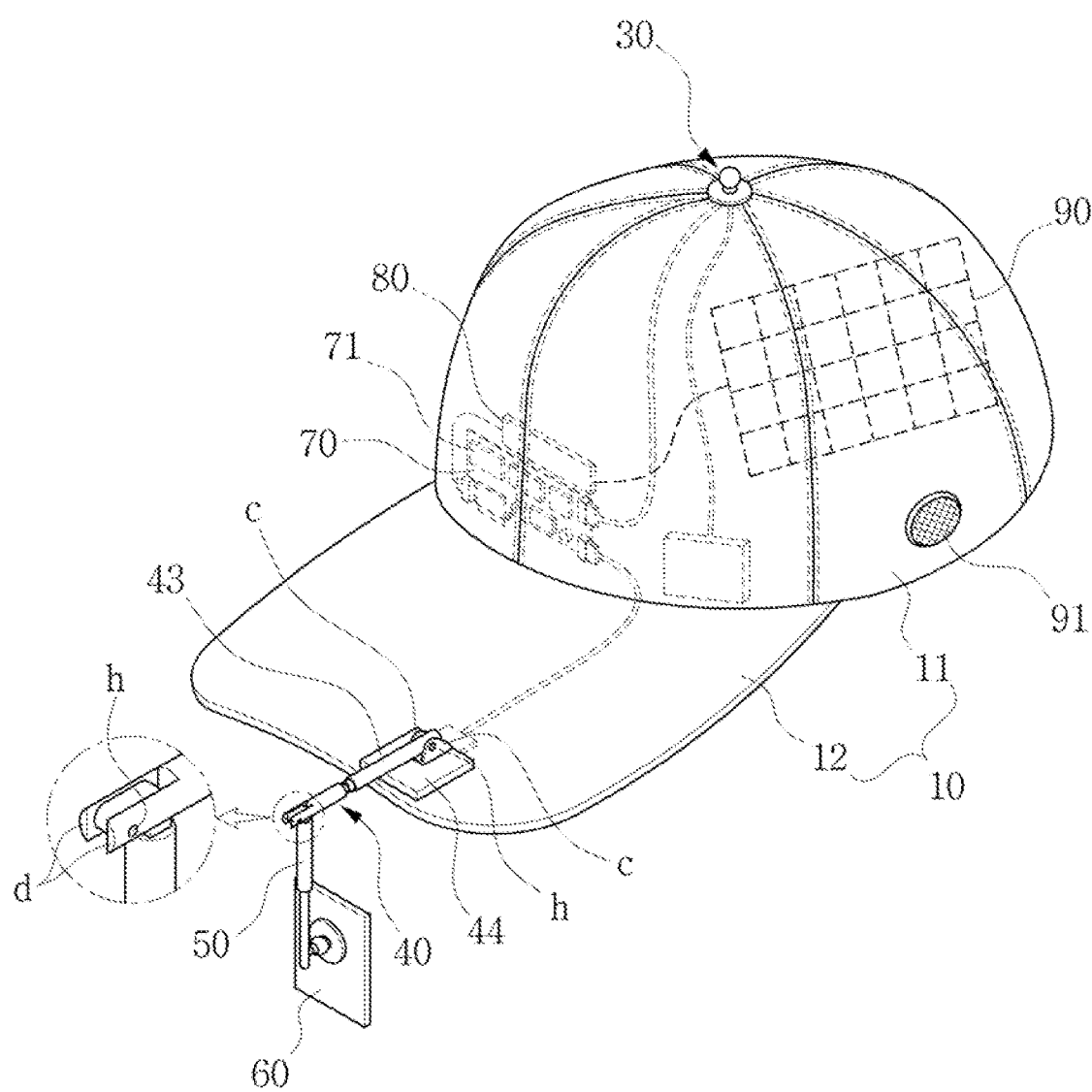

[Fig. 2]
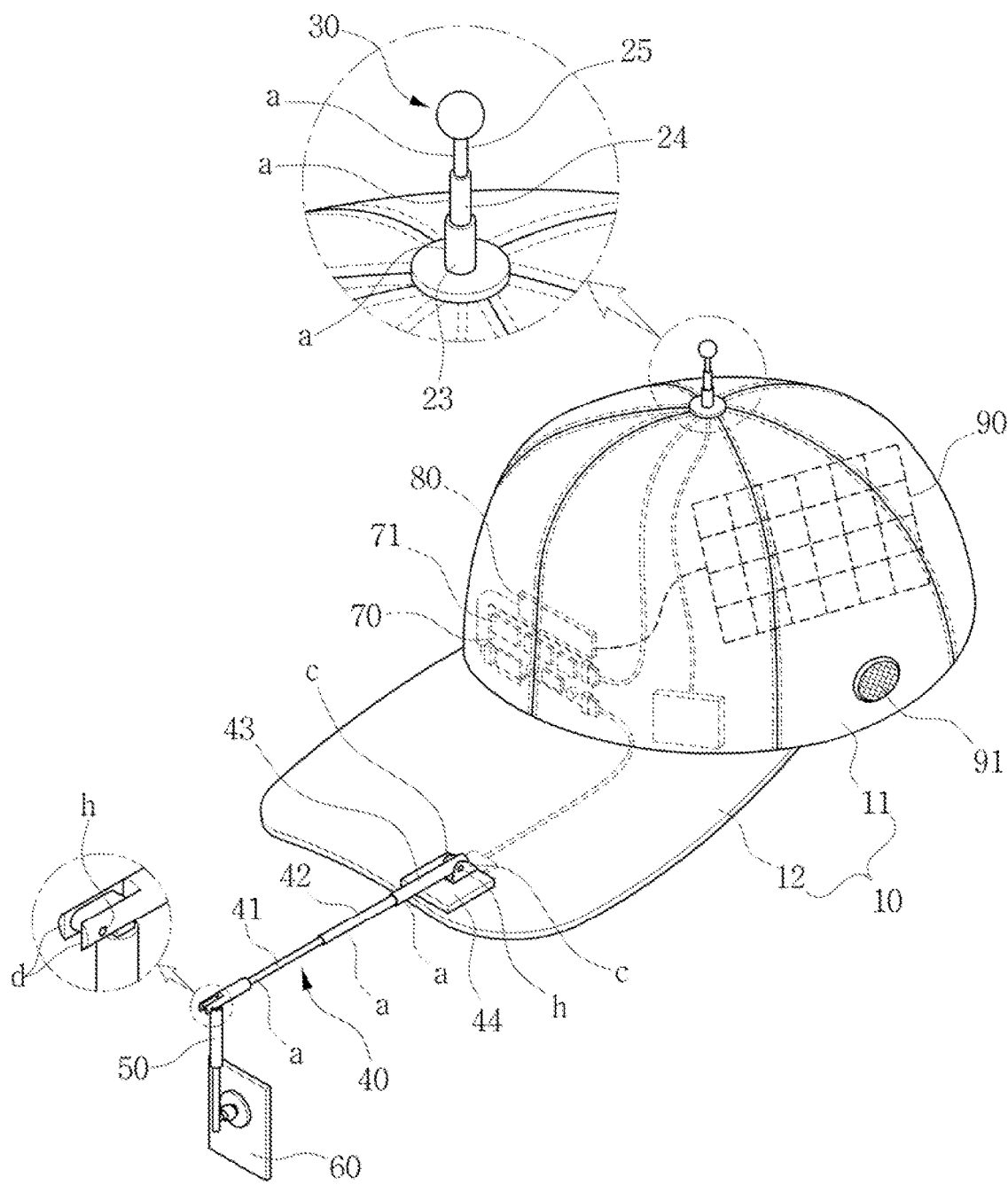

[Fig. 3]
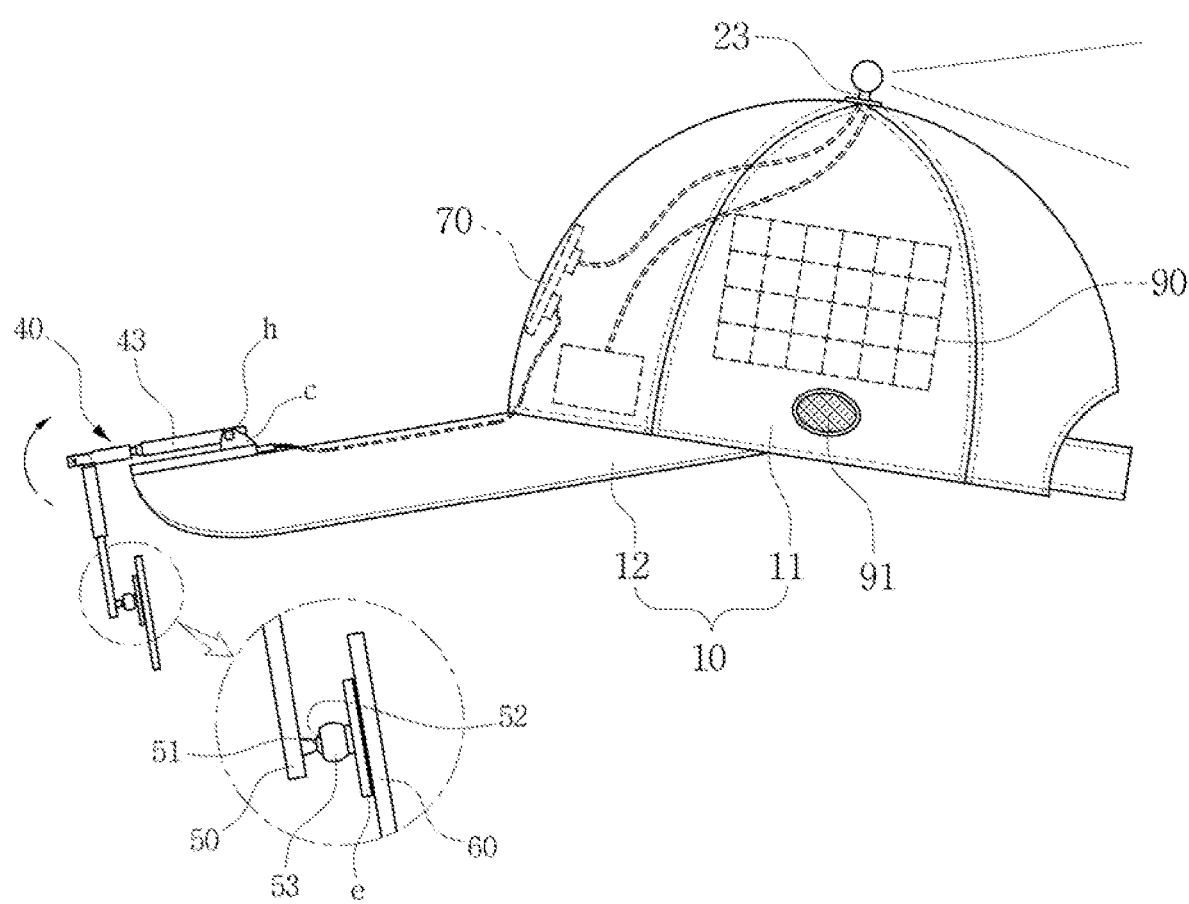

[Fig. 4]
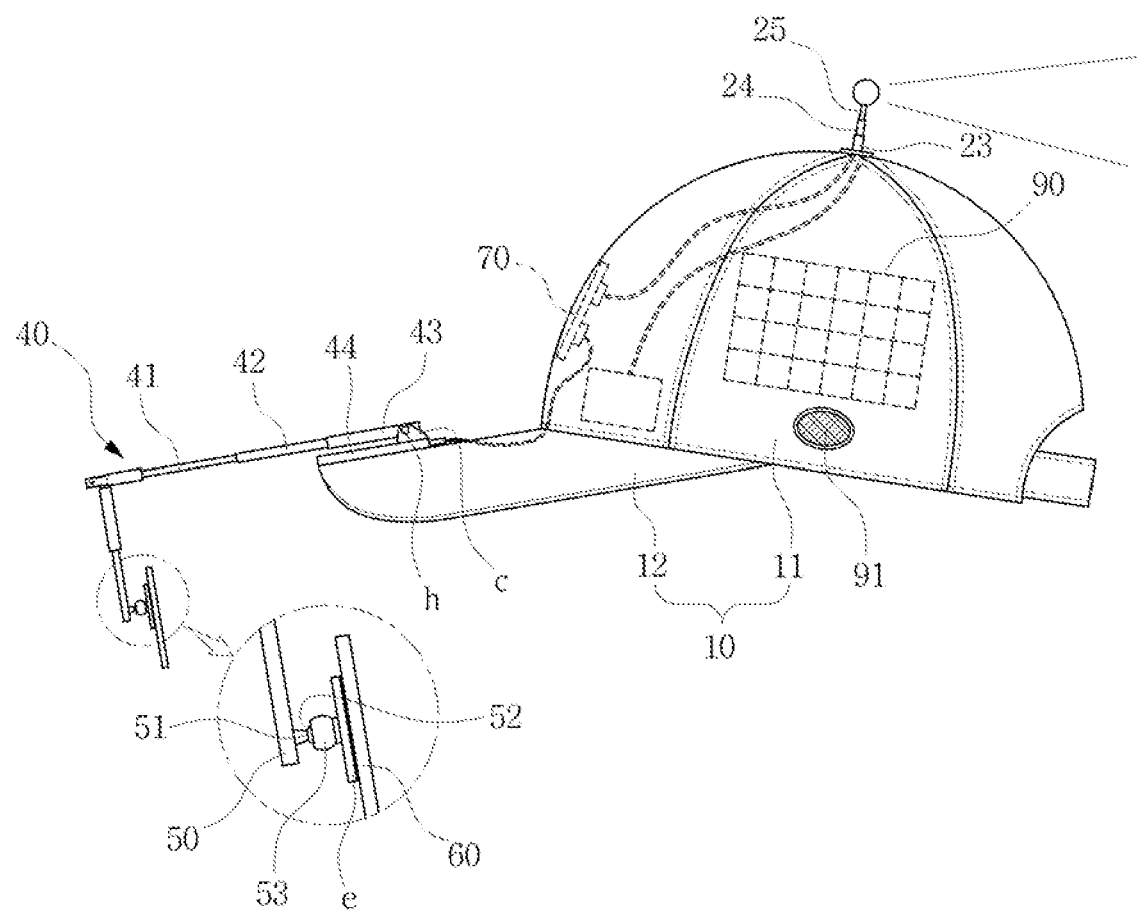

[Fig. 5A]
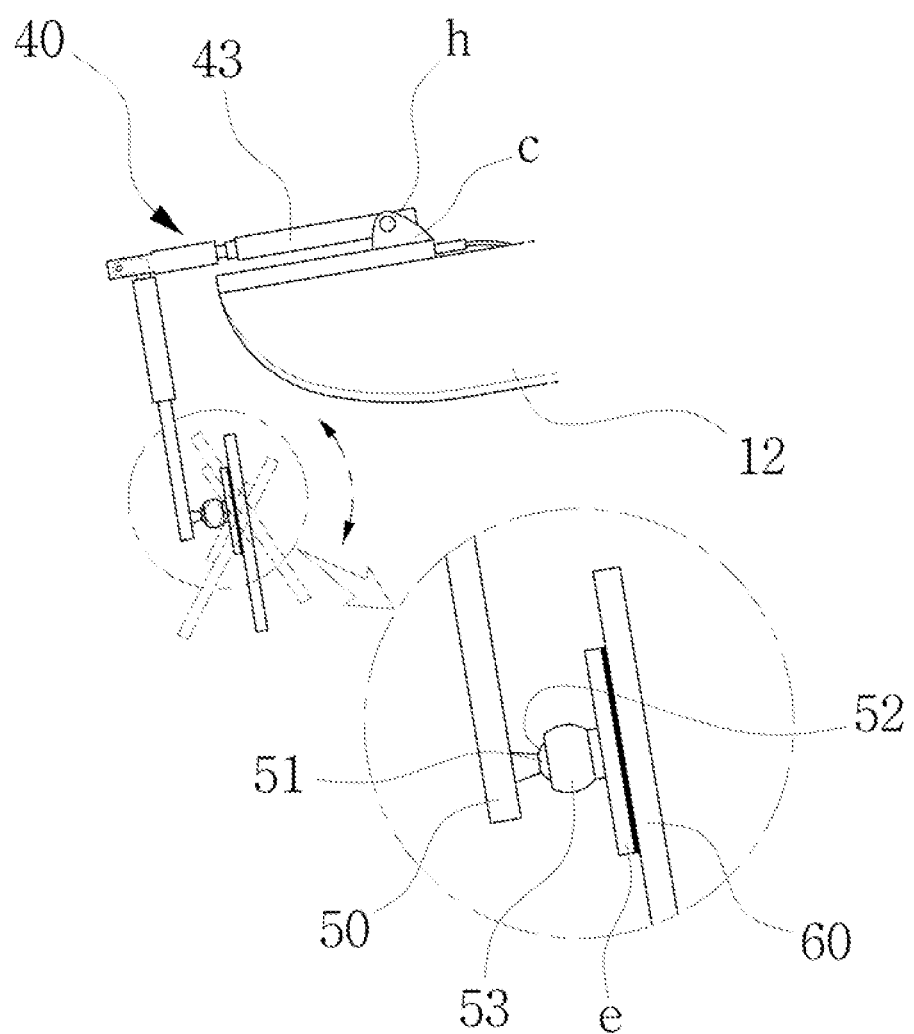

[Fig. 5B]
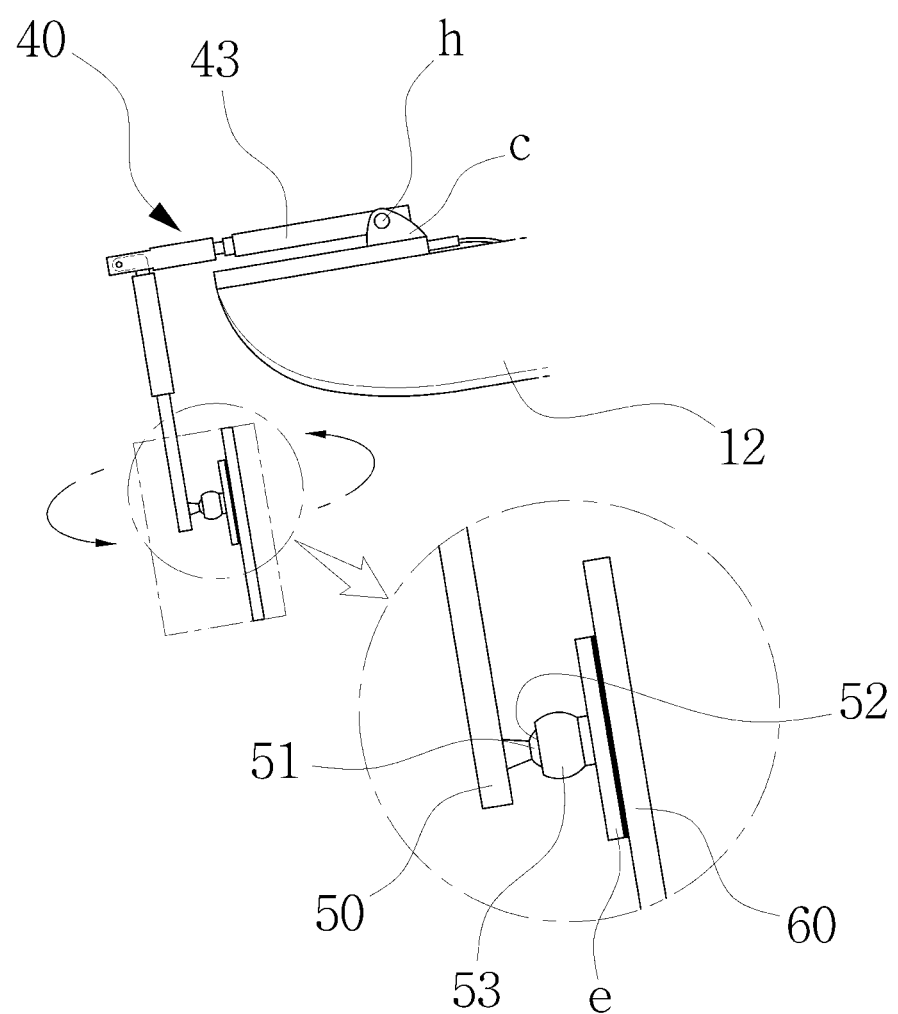

[Fig. 6A]
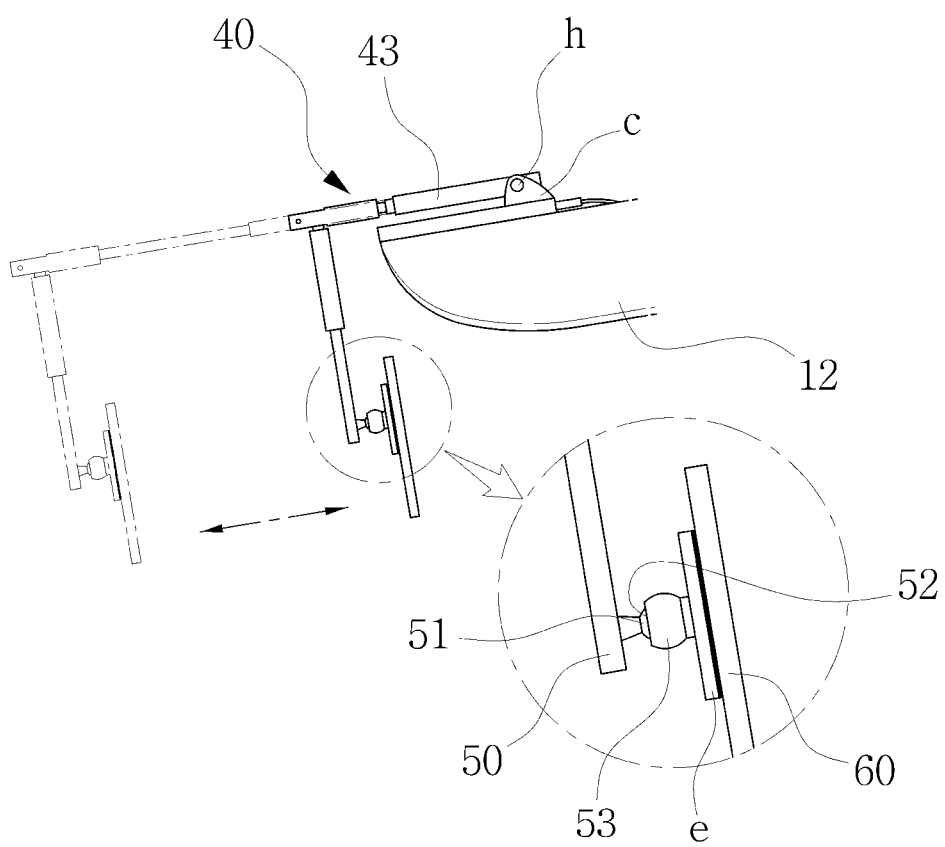

[Fig. 6B]
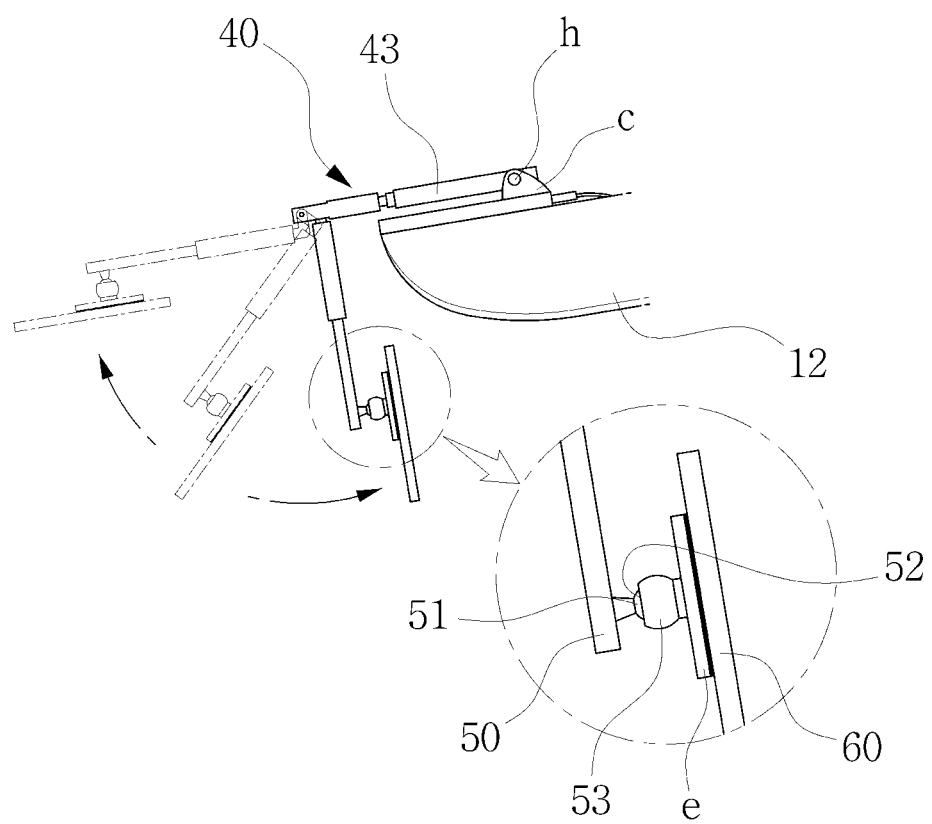

[Fig. 7]
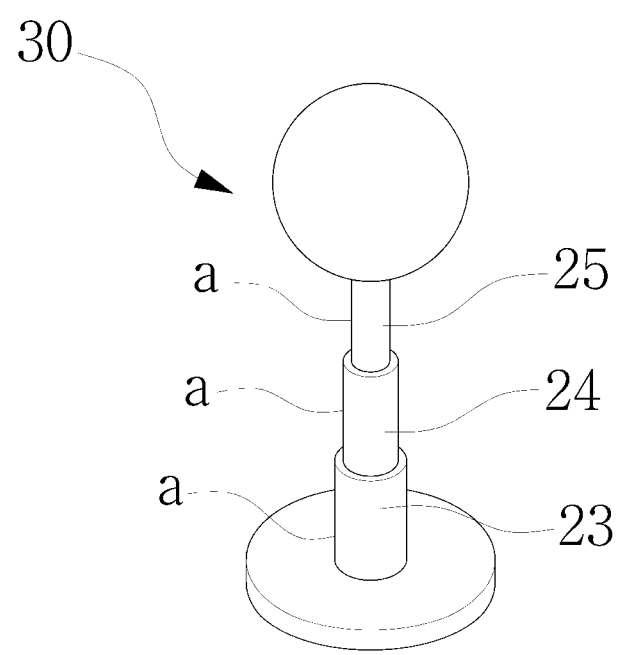

[Fig. 8]
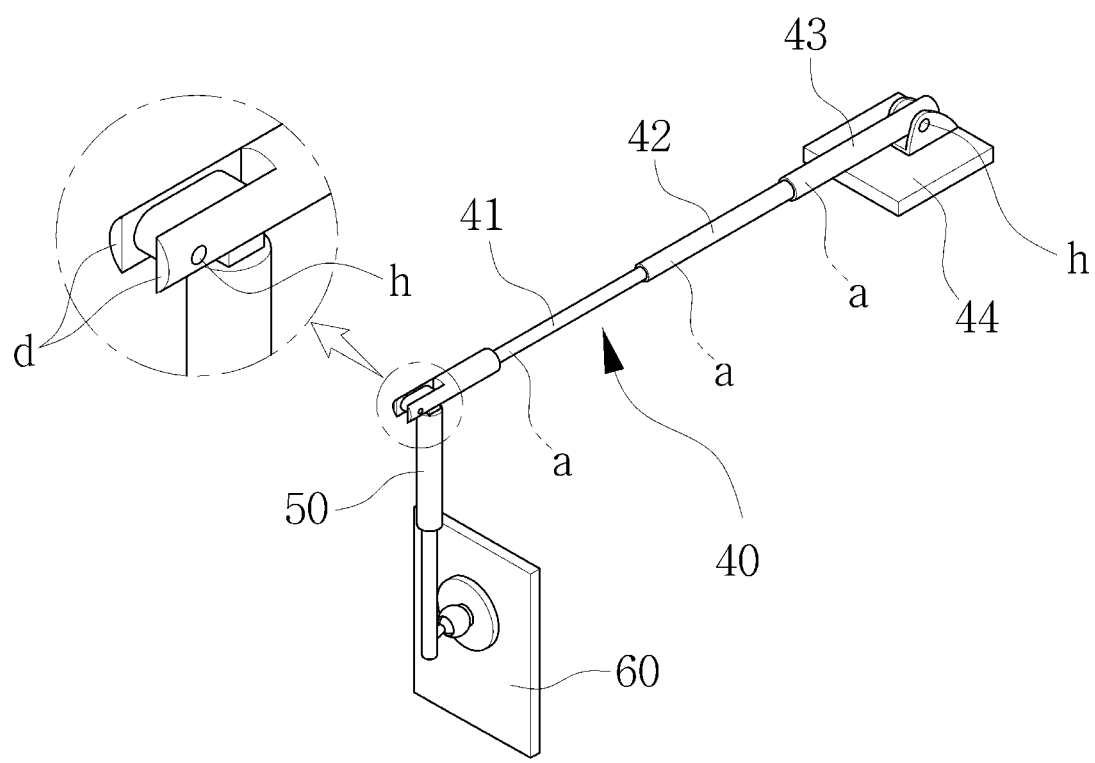

[Fig. 9]
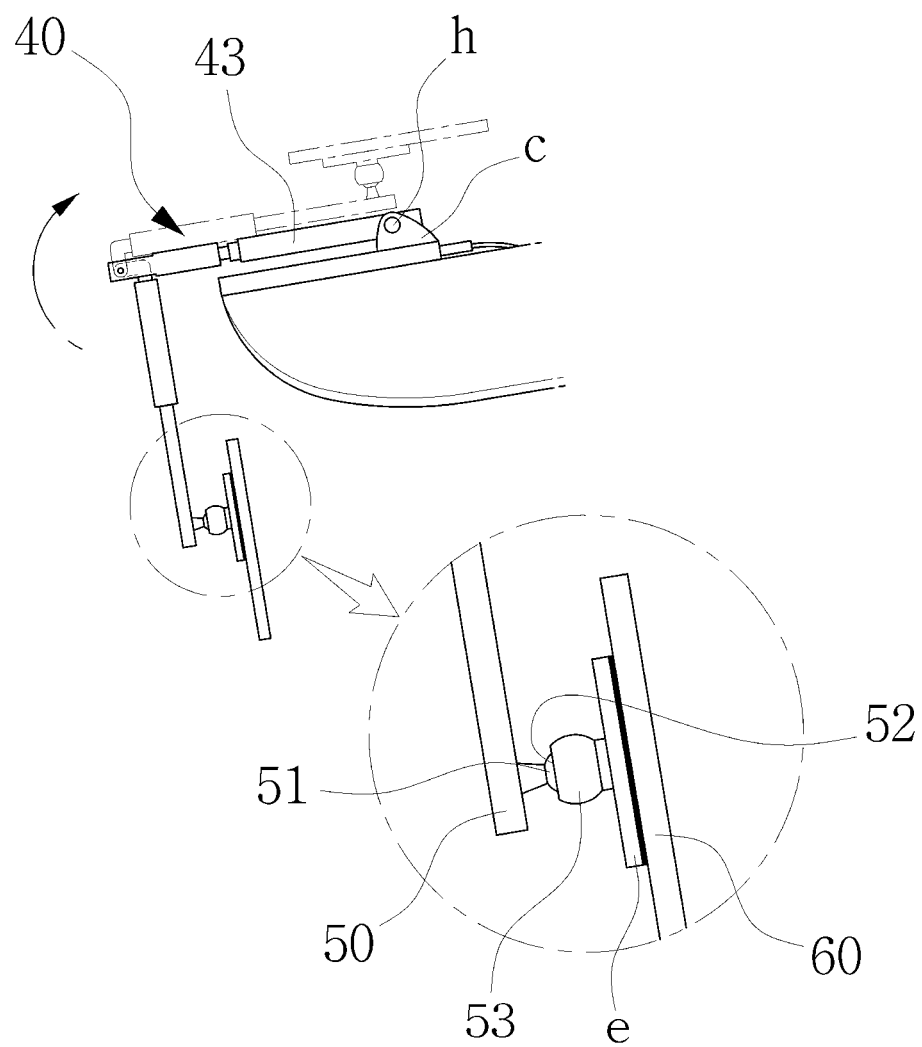

HAT HAVING REAR-VIEW CAMERA

CROSS REFERENCE TO RELATED APPLICATION OF THE INVENTION

The present application claims the benefit of Korean Patent Application No. 10-2022-0090196 filed in the Korean Intellectual Property Office on Jul. 21, 2022, the entire contents of which are incorporated herein by reference.

BACKGROUND OF THE INVENTION

Field of the Invention

The present invention relates to a hat having a rear-view camera, and more specifically, to a hat having a rear-view camera that is capable of allowing the rear-view camera to be freely adjusted in height from the top of an insertion body of a hat body to transmit a video providing a situation behind a wearer who wears the hat body to a display part freely adjustable in length forward and backward from the front side of a brim of the hat body, so that the wearer watches the video provided on the display part to easily recognize a long-range or short-range situation behind him or her when he or she is walking, irrespective of whether he or she has poor eyesight or not, while he or she is keeping his or her eyes forward, without turning his or her head or body.

BACKGROUND OF THE RELATED ART

Generally, a hat with a brim is effective in protecting wearers from the sun or rain and usually used when they exercise or go out.

Fast walking and backward walking do not have any problems with the heart, which are more effective than jogging, and above all, such walking is good for women or elders. In this case, the backward walking allows the muscles not normally used to be utilized and stimulates the heels of feet a lot so that it is good for training for the lower body and blood circulation.

A person walks while keeping his or her eyes forward, and accordingly, he or she cannot recognize any situation behind him or her.

If a dangerous situation happens behind the walking person, he or she does not handle the dangerous situation appropriately and is thus exposed to the danger of safety accidents. So as to recognize the situation behind him or her, while he or she is walking, he or she turns his or her head frequently to observe the situation behind him or her. However, it is not easy to carefully observe the situation behind him or her while he or she is walking.

If he or she fails to recognize the situation behind him or her, he or she does not handle any emergency situation behind him or her to cause safety accidents during his or her walking. Therefore, there is a definite need to develop a safety device for recognizing the situations on the left and right sides from a walking person as well as the situation behind him or her during his or her walking, while he or she is keeping his or her eyes forward, without turning his or her head or body.

SUMMARY OF THE INVENTION

Accordingly, the present invention has been made in view of the above-mentioned problems occurring in the related art, and it is an object of the present invention to provide a hat having a rear-view camera that is capable of having a hat body with an insertion body and a brim, an upward/downward extension and contraction part disposed on the peak of the insertion body and thus extending upward or contracting downward vertically to freely adjust the rear-view camera disposed on top thereof upward and downward in height, and a forward/backward extension and contraction part freely adjusted forward and backward in length from the top of the brim to freely adjust a display part forward and backward, so that the rear-view camera is freely adjusted in height on the top of the insertion body of the hat body to allow a video providing a situation behind a wearer who wears the hat body to be transmitted to the display part freely adjusted in length forward and backward from the front side of the brim of the hat body and thus allow the wearer to visually recognize the long-range or short-range situation behind him or her easily through the display part when he or she is walking, irrespective of whether he or she has poor eyesight or not, while he or she is keeping his or her eyes forward, without turning his or her head or body.

To accomplish the above-mentioned objects, according to the present invention, there is provided a hat having a rear-view camera mounted thereon, including: a hat body having an insertion body adapted to insert a wearer's head and a brim located on the front side of the insertion body; an upward/downward extension and contraction part extending upward or contracting downward vertically from the center of top of the insertion body; the rear-view camera disposed on top of the upward/downward extension and contraction part; a forward/backward extension and contraction part extending forward and contracting backward from top of the brim; a vertical support bar whose top portion is connected to the underside of the front portion of the forward/backward extension and contraction part by means of a hinge; a display part disposed on the vertical support bar; a controller disposed inside the insertion body and connected to the rear-view camera and the display part; and a battery connected to the controller, wherein a video obtained from the rear-view camera is transmitted to the display part and monitored by the wearer.

According to the present invention, desirably, the upward/downward extension and contraction part may be disposed on the peak of the insertion body and thus extend upward or contract downward to allow the wearer to watch a situation behind him or her and situations on his or her left and right sides.

According to the present invention, desirably, the upward/downward extension and contraction part may include: a top base located at the center of top of the insertion body; a first vertical support bar located vertically on top of the top base; a second vertical support bar having a lower portion drawn from a space portion formed at the inside of the first vertical support bar; and a third vertical support bar having a lower portion drawn from a space portion formed at the inside of the second vertical support bar, and the rear-view camera is disposed on top of the third vertical support bar.

According to the present invention, desirably, the forward/backward extension and contraction part may include: a first horizontal support bar; a second horizontal support bar having a lower portion drawn from a space portion formed at the inside of the first horizontal support bar; a third horizontal support bar having a lower portion drawn from a space portion formed at the inside of the second horizontal support bar; a fixed plate fixedly located on top of the brim; support members spaced apart from each other on top of the fixed plate by a given distance; a first hinge fixedly passing through the support members and the rear side of the first horizontal support bar after the rear side of the first horizontal support bar has been located between the support members; a plurality of front support members formed on the front side of the third horizontal support bar; and a second hinge fixedly passing through the front support members and the top of the vertical support bar after the top of the vertical support bar has been fitted to the space between the front support members.

According to the present invention, desirably, the battery may be connected to a solar cell panel having a plurality of solar cells located on the outer periphery of the insertion body.

According to the present invention, desirably, the hat may further include a sound generator for generating a voice or sound.

BRIEF DESCRIPTION OF THE DRAWINGS

The above and other objects, features and advantages of the present invention will be apparent from the following detailed description of the embodiments of the invention in conjunction with the accompanying drawings, in which:

FIG. 1 is a perspective view showing a hat having a rear-view camera according to the present invention;

FIG. 2 is a perspective view showing operating states of an upward/downward extension and contraction part and a forward/backward extension and contraction part of the hat having a rear-view camera according to the present invention;

FIG. 3 is a side view showing the hat having a rear-view camera according to the present invention;

FIG. 4 is a side view showing operating states of the upward/downward extension and contraction part and the forward/backward extension and contraction part of FIG. 3;

FIGS. 5A, 5B, 6A and 6B are side views showing operating states of the forward/backward extension and contraction part and a vertical support bar of the hat having a rear-view camera according to the present invention;

FIG. 7 is a schematic perspective view showing the upward/downward extension and contraction part of the hat having a rear-view camera according to the present invention;

FIG. 8 is a schematic perspective view showing the forward/backward extension and contraction part of the hat having a rear-view camera according to the present invention; and FIG. 9 is a side view showing an operating state in which a vertical support bar is folded to the forward/backward extension and contraction part of the hat having a rear-view camera according to the present invention.

DETAILED DESCRIPTION OF THE PREFERRED EMBODIMENTS

Exemplary embodiments of the present invention will be described in detail below with reference to the accompanying drawings.

The present invention may be modified in various ways and may have several exemplary embodiments. Specific exemplary embodiments of the present invention are illustrated in the drawings and described in detail in the detailed description. An embodiment of the present invention as will be discussed later will be in detail described so that it may be carried out easily by those having ordinary skill in the art, and therefore, this does not limit the idea and technical scope of the invention.

In the description, the shapes of the components shown in the drawing may be exaggerated for clarity of illustration. It should be noted that the parts corresponding to those of the drawings are indicated by corresponding reference numerals.

FIG. 1 is a perspective view showing a hat having a rear-view camera according to the present invention, FIG. 2 is a perspective view showing operating states of an upward/downward extension and contraction part and a forward/backward extension and contraction part of the hat having a rear-view camera according to the present invention, FIG. 3 is a side view showing the hat having a rear-view camera according to the present invention, FIG. 4 is a side view showing operating states of the upward/downward extension and contraction part and the forward/backward extension and contraction part of FIG. 3, FIGS. 5A to 6B are side views showing operating states of the forward/backward extension and contraction part and a vertical support bar of the hat having a rear-view camera according to the present invention, FIG. 7 is a schematic perspective view showing the upward/downward extension and contraction part of the hat having a rear-view camera according to the present invention, FIG. 8 is a schematic perspective view showing the forward/backward extension and contraction part of the hat having a rear-view camera according to the present invention, and FIG. 9 is a side view showing an operating state in which a vertical support bar is folded to the forward/backward extension and contraction part of the hat having a rear-view camera according to the present invention.

Now, an explanation of a hat having a rear-view camera according to the present invention will be given in detail with reference to FIGS. 1 to 9.

The hat having a rear-view camera according to the present invention largely includes a hat body 10, an upward/downward extension and contraction part 20, the rear-view camera 30, a forward/backward extension and contraction part 40, a vertical support bar 50, a display part 60, a controller 70, and a battery 80.

The hat body 10 includes an insertion body 11 having an inner space portion 11a adapted to insert an outer periphery of a wearer's head.

Further, the hat body 10 includes a brim 12 disposed on the front side of the insertion body 11 to protect the wearer's face from the sun.

Accordingly, the outer periphery of the insertion body 11 serves to protect the wearer's head from the sun, and the brim 12 serves to protect his or her face from the sun.

Further, the upward/downward extension and contraction part is disposed on the peak of the insertion body 11 of the hat body 10 and thus extends upward or contracts downward vertically to the form of an antenna, so that the rear-view camera 30 disposed on the upward/downward extension and contraction part is adjusted in height through the upward extension or downward contraction to allow the wearer to recognize a wide range situation around him or her inclusive of situations on his or her left and right sides and a situation behind him or her, without having any blind spot.

The upward/downward extension and contraction part is configured to extend upward and contract downward from a center of the top of the insertion body 11.

That is, the upward/downward extension and contraction part has the structure of an antenna so that it extends upward or contracts downward.

The upward/downward extension and contraction part includes a top base located at the center of top of the insertion body 11.

Further, the upward/downward extension and contraction part includes a first vertical support bar 23 located vertically on top of the top base.

Besides, the upward/downward extension and contraction part includes a second vertical support bar 24 having a lower portion drawn from a space portion a formed at the inside of the first vertical support bar 23.

Moreover, the upward/downward extension and contraction part includes a third vertical support bar 25 having a lower portion drawn from a space portion a formed at the inside of the second vertical support bar 24.

The rear-view camera 30 is located on top of the third vertical support bar 25.

Under the above-mentioned configuration, the upward/downward extension and contraction part extends upward vertically from top thereof, and a video providing a long-range situation behind the wearer, which is obtained through the rear-view camera 30 located on top of the third vertical support bar of the upward/downward extension and contraction part, is transmitted to the display part 60 through the controller 70 connected to the rear-view camera 30, so that the wearer who wears the insertion body 11 visually recognizes the long-range situation behind him or her easily. Contrarily, the upward/downward extension and contraction part contracts downward vertically from top thereof, and a video providing a short-range situation behind the wearer, which is obtained through the rear-view camera 30 located on top of the third vertical support bar 25 of the upward/downward extension and contraction part, is transmitted to the display part 60 through the controller 70 connected to the rear-view camera 30, so that the wearer who wears the insertion body 11 visually recognizes the short-range situation behind him or her easily.

The rear-view camera 30 is located on top of the upward/downward extension and contraction part.

In specific, the rear-view camera 30 is located on top of the third vertical support bar 25 of the upward/downward extension and contraction part and thus rotates freely in every direction on top of the third vertical support bar 25.

The forward/backward extension and contraction part 40 extends forward and contracts backward from top of the brim 12.

The forward/backward extension and contraction part 40 has a structure of a known antenna freely extending forward or contracting backward in length.

Further, the forward/backward extension and contraction part 40 includes a first horizontal support bar 41 and a second horizontal support bar 42 having a lower portion drawn from a space portion a formed at the inside of the first horizontal support bar 41.

Moreover, the forward/backward extension and contraction part 40 includes a third horizontal support bar 43 having a lower portion drawn from a space portion a formed at the inside of the second horizontal support bar 42.

Besides, the forward/backward extension and contraction part 40 includes a fixed plate 44 fixedly located on top of the brim 12.

Further, the forward/backward extension and contraction part 40 includes support members c spaced apart from each other on top of the fixed plate 44 by a given distance.

In this case, the rear side of the first horizontal support bar 41 is located between the support members c, and next, a hinge h fixedly passes through the support members c and the rear side of the first horizontal support bar 41.

Besides, a plurality of front support members d are formed on the front side of the third horizontal support bar 43.

The top of the vertical support bar 50 is inserted into a space between the front support members d, and next, a hinge h fixedly passes through the front support members d and the top of the vertical support bar 50.

Under the above-mentioned configuration, the situation behind the wearer, which is transmitted from the display part 60 connected to the forward/backward extension and contraction part 40 freely adjusted in length forward and backward from the top of the brim 12 in front of the wearer's face, is visually recognized easily, irrespective of whether the wearer has poor eyesight or not.

The top of the vertical support bar 50 is connected to the underside of the front side of the forward/backward extension and contraction part 40 by means of the hinge h.

As mentioned above, the plurality of front support members d are formed on the front side of the third horizontal support bar 43.

As a result, the top of the vertical support bar 50 is inserted into the space between the front support members d, and next, the hinge h fixedly passes through the front support members d and the top of the vertical support bar 50.

Accordingly, the vertical support bar 50 is configured to easily rotate up and down from the front side of the third horizontal support bar 43.

Further, the vertical support bar 50 includes a rotary ball 51 disposed on the lower portion of the rear side thereof.

Further, the vertical support bar 50 includes a front base e located on the front of the display part 60.

Besides, the vertical support bar 50 includes a rotation guide member 53 located on the front of the front base e and a rotation guide groove 52 formed on the front of the rotation guide member 53.

Accordingly, the outer periphery of the rear side of the rotary ball 51 is inserted into the inner periphery of the rotation guide groove 52 and rotatable freely by 360° therein.

In this case, the rotation guide member 53 disposed on the front of the display part 60 freely rotates by 360° under the brim 12, while depending upon the rotary ball 51 disposed on the rear side of the vertical support bar 50, so that the display part 60 is freely controlled to the wearer's desired direction easily and visually recognized in position by him or her.

The display part 60 is connectedly located on the vertical support bar 50.

The display part 60 is configured to be connected to the controller 30 to thus display the video obtained through the rear-view camera 30.

If the wearer does not watch the video displayed on the display part 60, the display part 60 is folded and located close to the brim 12 under the brim 12.

The controller 70 is connected to the rear-view camera 30 and the display part 60 and located inside the insertion body 11.

The controller 70 has a switch 71 for turning on or off the power supplied from the battery 80 to the rear-view camera 30 and the display part 60.

The battery 80 is connected to the controller 70.

Further, the battery 80 is a known rechargeable battery or connected to a solar cell panel 90 having a plurality of solar cells located on the outer periphery of the insertion body 11.

The solar cell panel 90 converts solar energy into electric energy and transmits the electric energy to the battery 80.

According to the present invention, further, the video obtained from the rear-view camera 30 is transmitted to the display part 60 and monitored by the wearer.

Under the above-mentioned configuration, the hat having the rear-view camera according to the present invention includes the hat body 10 having the insertion body 11 and the brim 12, the upward/downward extension and contraction part disposed on the peak of the insertion body 11 and thus extending upward or contracting downward vertically to freely adjust the rear-view camera 30 disposed on top thereof upward and downward in height, and the forward/backward extension and contraction part 40 freely adjusted forward and backward in length from the top of the brim 12 to freely adjust the display part 60 forward and backward in front of the wearer's face, so that the rear-view camera 30 is freely adjusted in height on the top of the insertion body 11 of the hat body 10 to allow the video providing the situation behind the wearer to the display part 60 freely adjusted in length forward and backward from the front side of the brim 12 of the hat body 10 and thus allow the wearer to visually monitor and recognize the long-range or short-range situation behind him or her easily through the display part 60, irrespective of whether he or she has poor eyesight or not.

Further, the hat having the rear-view camera according to the present invention includes a sound generator 91 such as a speaker, and the like for generating a voice or sound.

The sound generator 91 generates signals such as a voice, a warning sound, and the like if there is a danger within the long-range or short-range situation behind the wearer, and even though he or she unconsciously does not see the display part 60 to thus fail to recognize the video providing the situation behind the wearer, he or she can auditorily recognize the emergency situation and appropriately handle it.

As described above, the hat having the rear-view camera according to the present invention is configured to have the hat body with the insertion body and the brim, the upward/downward extension and contraction part disposed on the peak of the insertion body and thus extending upward or contracting downward vertically to freely adjust the rear-view camera disposed on top thereof upward and downward in height, and the forward/backward extension and contraction part freely adjusted forward and backward in length from the top of the brim to freely adjust the display part forward and backward in front of the wearer's face, so that the rear-view camera is freely adjusted in height on the top of the insertion body of the hat body to allow the video providing the situation behind the wearer to be transmitted to the display part freely adjusted in length forward and backward from the front side of the brim of the hat body and thus allow the wearer to easily watch the long-range or short-range situation behind him or her through the display part when he or she is walking, irrespective of whether he or she has poor eyesight or not, while he or she is keeping his or her eyes forward, without turning his or her head or body, thereby recognizing the situations on his or her left and right sides as well as the situation behind him or her.

The present invention may be modified in various ways and may have several exemplary embodiments. Accordingly, it should be understood that the invention covers all the modifications, equivalents, and replacements within the idea and technical scope of the invention. Therefore, the present invention is not to be restricted by the embodiments as mentioned above.

Therefore, persons skilled in the relevant art can appreciate that many modifications and variations are possible in light of the above teachings. It is therefore intended that the scope of the invention be limited not by this detailed description, but rather by the claims appended hereto.

What is claimed is:

1. A hat having a rear-view camera (30) mounted thereon, comprising:
a hat body (10) having an insertion body (11) adapted to insert a wearer's head and a brim (12) located on a front side of the insertion body (11);
an upward/downward extension and contraction part extending upward or contracting downward vertically from the center of top of the insertion body (11);
the rear-view camera (30) disposed on top of the upward/downward extension and contraction part;
a forward/backward extension and contraction part (40) extending forward and contracting backward from top of the brim (12);
a vertical support bar (50) whose top portion is connected to an underside of a front portion of the forward/backward extension and contraction part (40) by means of a hinge;
a display part (60) disposed on the vertical support bar (50);
a controller (70) disposed inside the insertion body (11) and connected to the rear-view camera (30) and the display part (60); and
a battery (80) connected to the controller (70),
wherein a video obtained from the rear-view camera (30) is transmitted to the display part (60) and monitored by the wearer.

2. The hat according to claim 1, wherein the upward/downward extension and contraction part is disposed on the peak of the insertion body (11) and thus extends upward or contracts downward to allow the wearer to watch a situation behind him or her and situations on his or her left and right sides.

3. The hat according to claim 1, wherein the upward/downward extension and contraction part comprises:
a top base located at the center of top of the insertion body (11);
a first vertical support bar (23) located vertically on top of the top base;
a second vertical support bar (2) having a lower portion drawn from a space portion (a) formed inside of the first vertical support bar (23); and
a third vertical support bar (25) having a lower portion drawn from a space portion (a) formed inside of the second vertical support bar (24), and
the rear-view camera (30) is disposed on top of the third vertical support bar (25).

4. The hat according to claim 1, wherein the forward/backward extension and contraction part (40) comprises:
a first horizontal support bar (41);
a second horizontal support bar (42) having a lower portion drawn from a space portion (a) formed inside of the first horizontal support bar (41);
a third horizontal support bar (43) having a lower portion drawn from a space portion (a) formed inside of the second horizontal support bar (42);
a fixed plate (44) fixedly located on top of the brim (12);
support members (c) spaced apart from each other on top of the fixed plate (44) by a given distance;
a first hinge (h) fixedly passing through the support members (c) and a rear side of the first horizontal support bar (41) after the rear side of the first horizontal support bar (41) has been located between the support members (c);
a plurality of front support members (d) formed on a front side of the third horizontal support bar (43); and
a second hinge (h) fixedly passing through the plurality of front support members (d) and the top of the vertical support bar (50) after the top of the vertical support bar

(50) has been fitted to a space between the plurality of front support members (d).

5. The hat according to claim 1, wherein the battery (80) is connected to a solar cell panel (90) having a plurality of solar cells located on an outer periphery of the insertion body (11).

6. The hat according to claim 1, further comprising a sound generator (91) for generating a voice or sound.

* * * * *